United States Patent [19]

Kamogawa et al.

[11] 3,777,060

[45] Dec. 4, 1973

[54] COLOR TELEVISION SIGNAL RECORDING AND REPRODUCING SYSTEM

[75] Inventors: Tushiro Kamogawa, Hirakata; Yoshihiro Okino, Kyoto; Isao Sato, Kawasaki; Noboru Okuno, Sennan, all of Japan

[73] Assignee: Matsushita Electric Industrial Co., Ltd., Osaka, Japan

[22] Filed: Sept. 3, 1971

[21] Appl. No.: 177,590

[30] Foreign Application Priority Data

Sept. 9, 1970 Japan ................................ 45/79467
Sept. 9, 1970 Japan ................................ 45/79468

[52] U.S. Cl. ........................................ 178/5.4 CD
[51] Int. Cl. ........................................ H04n 9/02
[58] Field of Search ................ 178/5.2, 5.4, 5.4 CD, 178/6.6 A, 6.7

[56] References Cited

UNITED STATES PATENTS

| | | | |
|---|---|---|---|
| 2,769,028 | 10/1956 | Webb | 178/5.4 CD |
| 2,960,563 | 11/1960 | Anderson | 178/5.4 CD |
| 3,459,885 | 8/1969 | Goldmark et al. | 178/5.4 CD |

*Primary Examiner*—Richard Murray
*Attorney*—Stevens, Davis, Miller & Mosher

[57] ABSTRACT

In the recording and reproduction of a color television signal including three component signals carrying color information of a scene, for instance the Y, I and Q signals, on a film by means of EVR or SV, two subcarriers at different frequencies are usually required. However, in reproduction a beat noise is likely to be created from the interference of the different subcarriers due to the light-sensitive characteristics of the film and non-linear characteristics of the system. In this respect, it is aimed to provide a color television signal recording and reproducing system, wherein one of the component signals is directly recorded without modulation and at least another component signal is recorded as a carrier-suppressed modulation signal.

10 Claims, 8 Drawing Figures

COLOR TELEVISION SIGNAL RECORDING AND REPRODUCING SYSTEM

The present invention relates to recording and reproducing systems for recording and reproducing color video signals.

There have recently been developed such recording and reproducing systems as EVR (Electronic Video Recording) and SV (Selectra Vision) for recording and reproducing color video as well as audio signals which may be coupled to the usual household color television set.

In these systems, color video signals are appropriately processed for recording on a monochrome silver salt photographic film by using an electron beam recorder. The recorded signal is reproduced in various ways peculiar to the individual systems.

An example of processing the signal is illustrated in a frequency diagram of FIG. 1 of the accompanying drawing.

In this example, luminance or Y signal and I and Q color video signals are used to amplitude modulate respective carrier waves, for multiplex recording of the modulated waves on a frequency division basis on a silver salt film. More particularly, the Y signal occupies a bandwidth ranging from 0 to 3 MHz, and the I and Q signals are converted into modulated waves covering bandwidths extending 0.5 MHz below and above the respective carriers of about 3.5 MHz and 5 MHz.

The processed signal having the above spectral characteristics and which is obtained from the video signal outputs of a color television camera, is recorded on the film one television frame portion on one film frame by the scanning of the electron beam recorder in accordance with the synchronizing signal of the television signal. Thus, one picture frame may be reproduced in black and white by the Y signal from one film frame. The carrier frequencies for the modulation of the I and Q signals are selected to be integral multiples of the horizontal scanning frequency of the television signal. By so doing, the modulated color video carrier signals are recorded on the film in the form of numerous vertical stripes at a constant pitch determined by the carrier frequency. It is well known to provide a d-C bias for the recording of the a-c modulated signals on the film.

In palyback, the film is scanned frame by frame by a flying spot tube or vidicon for conversion of the recorded information into the corresponding electric signal. The scanning line in playback need not coincide with the scanning line in recording. In other words, there is no problem in line tracking. The Y signal can be directly obtained from the scanning of the monochrome picture produced in recording. Also, since the relative phases of the I and Q signals are preserved in the recording as vertical stripes, the tracking error has no serious effect in reproducing the modulated waves. The recovered signals are then demodulated to obtain the Y, I and Q signals, from which the three primary color signals may be reproduced in the usual manner.

The signal processing method as mentioned above in connection with FIG. 1, however, presents a certain problem. In the reproduction of the recorded signal from the film, the I and Q signal carrier waves interfere with each other to generate a beat noise due to light-sensitive characteristics of the film and non-linear characteristics of the circuits involved. In case of the method of FIG. 1, a beat component at about 1.5 MHz is introduced within the frequency band of the Y signal, resulting in stripe-like noise in the reproduced picture. In order to prevent this noise, it is necessary to perfectly compensate the non-linear characteristics of the system including the light-sensitive characteristics of the film. This is, however, extremely difficult and cannot be a practical measure.

The beat noise may be rendered less pronounced by increasing the beat frequency as much as possible. To do so, however, necessitates increasing the carrier frequencies for the I signal. This is also difficult in practice, since the frequency coverage of the recording and reproducing parts of the system are limited. As a further alternative measure, it may be considered to reduce the carrier frequency for the Q signal. This, however, dictates either curtailing the bandwidth of the Y signal or reducing the bandwidth of the Q signal. In either case, degradated picture quality will be a result.

This invention is intended to overcome the above drawbacks, and it will now be described in conjunction with several preferred embodiments with reference to the accompanying drawings, in which.

Figure 1:
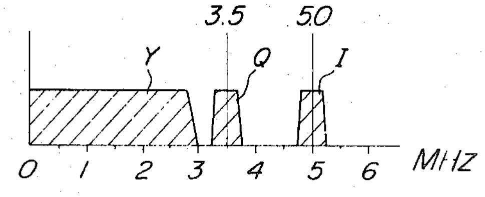
FIG. 1 PRIOR ART
FIG. 1 is a frequency diagram illustrating the operation mode of a prior-art color video signal recording and reproducing system.
Figure 2:
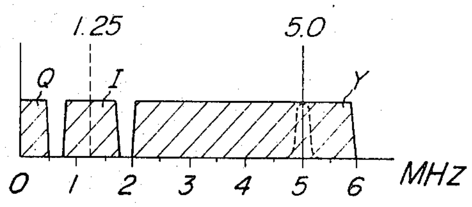
FIG. 2 is a frequency diagram illustrating the operation mode of an embodiment of the invention.

FIG. 2 shows a first embodiment of the invention. In this embodiment, the Y signal is converted into amplitude modulation of a subcarrier wave at 5 MHz for vestigial-side-band recording with the non-curtailed lower side-band covering about 3 MHz. The modulation degree is not 100 percent, but the subcarrier is made to prevail above a certain level. This is made so for the purpose of producing a subcarrier for the detection of the I signal in playback, to be described hereinafter in detail. One of the color signals, for instance the Q signal, is not modulated, so it frequency band ranges from 0 to 0.5 MHz. The other color signal, namely the I signal, is recorded as double side-band amplitude modulated signal covering a bandwidth extending 0.5 MHz below and above a subcarrier frequency of 1.25 MHz and lying between and spaced from the Q signal band and the Y signal modulation lower side-band. This amplitude modulation is carrier-suppressed type by using a balanced modulator so that the subcarrier 1.25 MHz is not recorded. This has an effect of eliminating the otherwise possible introduction of noise components within the Y signal band from the interference of higher harmonic components of 1.25 MHz and the beat frequency component between the 1.25-MHz subcarrier itself and the non-suppressed 5-MHz luminance signal modulation subcarrier.

In this system, it is necessary to produce a reconstituted subcarrier for the I signal reproduction from the luminance signal modulation subcarrier frequency. Therefore, both the subcarrier frequencies should be in a simple integral number ratio and they should be synchronized to each other. In case of FIG. 2, this ratio is 1 : 4. Also, both the subcarrier frequencies are selected to be integral multiples of the horizontal scanning frequency to eliminate the line tracking problem as mentioned earlier. The above three processed signals are recorded in multiplex recording on a film.

In playback, the recorded signals are recovered from the film by the scanning thereof with a flying spot tube, vidicon, etc., and separated one from the rest for the reproduction of the Y, Q and I signals. The Q signal may be recovered through a suitable low-pass filter. The modulated Y signal may be separated through a suitable high-pass filter and demodulated through a low-pass filter meeting the relevant vestigial-side-band requirement. The I signal modulation may be separated through a suitable bandpass filter. The subcarrier required for the detection of the I signal is produced from the Y signal modulation subcarrier. More particularly, from the separated Y signal modulation extremely narrow upper and lower portions symmetrical with respect to the subcarrier as indicated by dashed line in FIG. 2 are separated from a narrow bandpass filter and coupled to an amplitude limiter to remove amplitude variations, thereby obtaining a reference output of a constant amplitude and free from phase variations. As mentioned earlier, the modulation of the Y signal is restricted so as to make the subcarrier amplitude survive above a constant level, so that the reference output will never intermittently vanish. The frequency of the reference output thus obtained is frequency divided according to the predetermined integral number ratio to obtain the reconstituted subcarrier, which is used to demodulate the I signal modulation so as to obtain the I signal. In the detection of the Y signal, this reference output may also be used to simultaneously detect the output of the vestigial-side-band low-pass filter. By so doing, undesired quadrature distortion components accompanying the vestigial-side-band modulation may be removed to obtain video signals of excellent quality.

In the above manner, the Y, I and Q signals may be recovered. The detection of the Y signal, however, is not essential when reproducing the color video signals for broadcast television signal receivers. In case of the NTSC system, the I and Q signals are used to place quadrature phase modulation on a reinserted subcarrier at a frequency 3.58 MHz lower than the Y signal modulation subcarrier frequency while simultaneously inserting required color burst and horizontal and vertical synchronizing signals with respect to the Y signal modulation separated through the high-pass filter. The resultant signal as a whole is then appropriately frequency converted into coincidence with the relevant television channel. In this way, the reception and reproduction of the transmitted signal via the antenna of the usual television receiver set is possible.

As is described, in the preceding embodiment no subcarrier is present in the reproduced signal except for the luminance signal modulation subcarrier, so that no beat noise will result. Also, since the subcarrier for one color video signal is suppressed, no higher harmonic distorted components will be introduced within the luminance signal modulation band, which will otherwise result from the non-linear characteristics of the system. Further, it is possible to prevent elongation of the film and fluctuation of the scanning speed of the flying spot scanner or vidicon and the like from influencing the frequency of the reconstituted subcarrier for the detection of the color video signal from the luminance signal modulation subcarrier and hence influencing the detection of the color video signal.

As an alternative of the arrangement of FIG. 2, above the Q color video signal band may be laid the vestigial-side-band modulation of the Y signal, above which is laid the carrier-suppressed modulation of the I signal. Also, it is possible to interchange the I and Q signals wherein the Q signal is directly recorded without being used for modulation.

Figure 3:
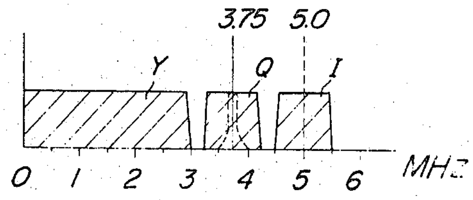
FIG. 3 is a frequency diagram illustrating the operation mode of another embodiment of the invention.

FIG. 3 shows another embodiment. In this embodiment, the Y signal is directly recorded, while the Q signal is recorded as both-side-band amplitude modulation and the I signal as carrier-suppressed amplitude modulation.

In playback, the recorded signal is recovered from the film by scanning it with a flying spot tube, vidicon or the like. Then, the Y signal may be separated through a suitable low-pass filter. The modulated Q signal may be separated through a suitable bandpass filter and demodulated to obtain the Q signal. The carrier-suppressed amplitude modulation with the I signal is separated through a suitable high-pass filter. The reconstituted subcarrier for the demodulation is produced from the 3.75-MHz Q signal modulated subcarrier. More particularly, by utilizing the integral multiple inter-subcarrier relation noted earlier the 3.75-MHz subcarrier is divided by 3 and then multiplied by 4 to produce a reconstituted subcarrier at 5 MHz. To this end, the Q signal modulation subcarrier wave should be continuous. To ensure this, the degree of modulation of the 3.75-MHz subcarrier with the Q signal is restricted such that the subcarrier survives with amplitude always above a constant level. (If the modulation degree is 100 percent, the subcarrier disappears.) As mentioned earlier, to produce a carrier wave of a constant amplitude from the amplitude modulation wave a narrow portion thereof centered at the subcarrier frequency as indicated by a dashed line in FIG. 3 may be separated through a narrow bandpass filter and coupled to an amplitude limiter for removal of ripple component. The carrier wave obtained in this way has a constant amplitude, is free from phase variation and provides perfect synchronization. Thus, the reconstituted subcarrier wave may be readily produced from it, and which is combined with the carrier-suppressed amplitude modulation of the I signal to detect the I signal. From the Y, I and Q signals thus reproduced, the corresponding color picture may be readily reproduced by the usual color television technique.

In the preceding embodiment, the higher one of the subcarrier frequencies is suppressed. Alternatively, it is possible to suppress the lower frequency subcarrier and produce the reconstituted subcarrier from the higher frequency subcarrier. Also interchanging the two color video signals has no practical effect.

As is described, in the preceding embodiment one of the subcarriers is suppressed, so that no beat noise results. Also, it is possible to prevent elongation of the film and flunctuation of the speed of the flying spot scanner or vidicon and the like from influencing the production of the reconstituted subcarrier for the detection of the color video signal from the limunance signal modulation subcarrier and hence influencing the detection of the color video signal.

Figure 4:
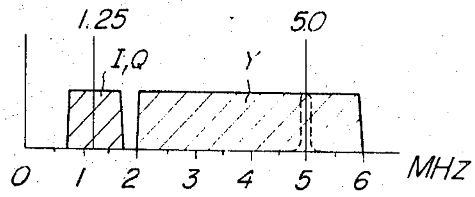
FIG. 4 is a frequency diagram illustrating the operation mode of a further embodiment of the invention.

FIG. 4 shows a further embodiment of the invention. In this embodiment, the Y signal is converted into a vestigial-side-band amplitude modulation signal of a subcarrier at a frequency of about 5 MHz and covering a bandwidth of about 4 MHz. The modulation degree is not 100 percent to provide for the survival of the subcarrier with amplitude above a certain level, so that a reconstituted subcarrier for the color video signal detection may be produced from the surviving subcarrier. (If the modulation degree is 100 percent, the subcarrier disappears.) The two color video signals, namely I and Q signals, are used to place carrier-suppressed quadrature phase modulation on a subcarrier at a frequency of about 1.25 MHz so that the modulation signal covers a bandwidth extending 0.5 MHz below and above the subcarrier frequency. Suppressing the subcarrier has an effect of the otherwise possible introduction of noise components such as high harmonic components of the 1.25-MHz subcarrier due to various non-linear characteristics of the system and beat component from interference between the 1.25-MHz subcarrier and the 5-MHz non-suppressed luminance signal modulated subcarrier within the Y signal modulation band. To eliminate the line tracking problem as mentioned earlier, both the subcarrier frequencies are selected to be integral multiples of the horizontal scanning frequency and such that they are in phase in each horizontal scan line. Further, they are synchronized to each other in a simple integral multiple ratio relation. In FIG. 4, the ratio is selected to be 1 : 4, which has a particular advantage to be described later. The two modulation signals are recorded in multiplex recording on a frequency division basis on a film with an electron beam recorder or the like.

Figures 6, 7, 8:
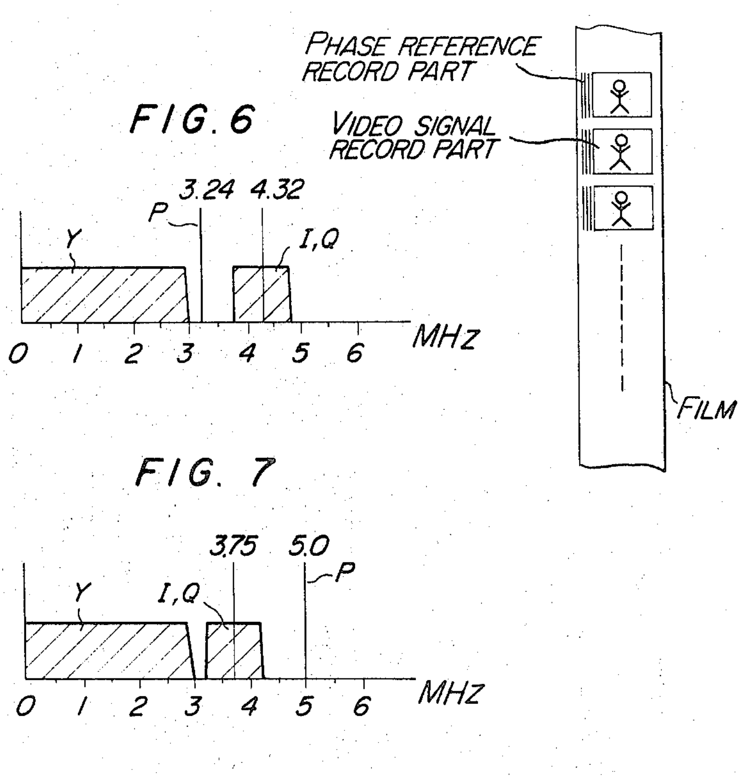
FIG. 6 is a frequency diagram illustrating the operation mode of a yet another embodiment of the invention.
FIG. 7 is a frequency diagram illustrating the operation mode of a yet further embodiment of the invention.
FIG. 8 is a fragmentary view of a film carrying a record pattern obtained in accordance with the invention.

In playback, the recorded signal is recovered from the film by the scanning thereof with a flying spot tube, vidicon or the like, and from the recovered signal the respective modulation signals are separated. The vestigial-side-band amplitude modulation of the luminance signal is separated through a suitable high-pass filter, and which is passed through a suitable vestigial-side-band filter to detect the luminance signal. The carrier-suppressed quadrature phase modulation with the color video signals is separated through a suitable low-pass filter. The synchronous reconstituted subcarrier necessary for the detection of the two color video signals from the separated carrier-suppressed quadrature phase modulation is produced from the luminance signal modulation subcarrier. To this end, narrow upper and lower sideband portions symmetrical with respect to the center frequency 5 MHz as indicated by a dashed line in FIG. 4 are separated by using a narrow bandpass filter. The filter output is then coupled to an amplitude limiter to remove amplitude fluctuation at a low frequency to obtain a 5-MHz wave at a constant amplitude and free from phase variation. This wave is frequency divided by 4 to obtain the 1.25-MHz reconstituted subcarrier for the detection of the color video signals. As mentioned earlier, the reconstituted subcarrier thus obtained is synchronized to the carrier-suppressed quadrature modulation of the color video signals, so that it is used to demodulate the quadrature phase modulation to obtain the two color video signals. To detect two signals from a quadrature phase modulation signal, it is usual to synchronously demodulate the modulation signal with two reinserted subcarriers synchronized to the modulation signal and 90° out of phase with each other. In preparing the reconstituted subcarrier by the frequency division of the synchronous 5-MHz wave by four as mentioned above, four different phases are available depending upon the way of taking a reference point for the start of counting of a counter. Namely, the reconstituted subcarrier can be in phase, 90° out of phase, 180° out of phase and 270° out of phase with the suppressed subcarrier. Accordingly, to produce a reconstituted subcarrier in phase with the suppressed subcarrier it is necessary to provide a certain reference phase. The phase reference may consist of several cycles of the original subcarrier inserted adjacent the front portion of each horizontal sync signal, that is, each horizontal line interval, similar to the color burst in the NTSC color television system. More particularly, in the recording several cycles of the 1.25-MHz subcarrier for the modulation with the color video signals may be recorded in a marginal portion of each film frame on the side of the start of the horizontal line. As mentioned earlier, this subcarrier frequency is an integral multiple of the horizontal scanning frequency, so that the reference signal is recorded as several, uniformly spaced vertical lines in the vertical scanning direction. In the frame portion, the subcarrier wave is of course never recorded since it is suppressed. This arrangement is shown in FIG. 8. This phase reference signal may be the color video signal modulation subcarrier itself or it may be a pulse signal of a constant pulse length with the rising or falling of each pulse serving as the phase reference. By having the starting point of counting of the frequency divider counter locked to this reference phase, a reconstituted subcarrier in phase with the suppressed subcarrier wave may be obtained. To produce another reconstituted subcarrier 90° out of phase with the other one, a phase shifter may be used. If more perfect synchronization is to be obtained, an output lagging in phase behind the in-phase reconstituted subcarrier by one cycle of the luminance signal modulation subcarrier wave may be used.

In the above manner, by taking perfect synchronization with the 5-MHz output used as the reference clock signal perfect synchronous detection can be expected even if timing variations of the reconstituted subcarrier wave due to elongation of the film and fluctuation of the speed of the flying spot or the scanning speed of the vidicon results, since the luminance signal modulation subcarrier and the color video signal modulation subcarrier are subject to frequency variations of the same amount.

In the above manner the luminance signal and the two color video signals may be recovered. The detection of the Y signal, however, is not essential when reproducing the color video signals for the usual color television receiving set as explained below with reference to FIG. 5.

Figure 5:
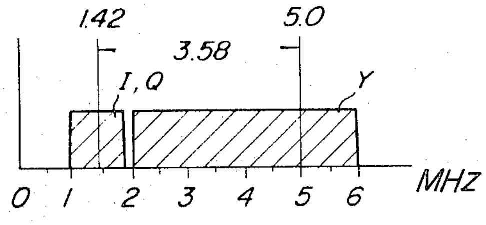
FIG. 5 is a frequency diagram illustrating the operation mode of a still further embodiment of the invention.

FIG. 5 shows a further embodiment of the invention applied to the NTSC system. In this case, the two color video signals, namely the I and Q signals, are used to place quadrature phase modulation on a subcarrier at a frequency of 1.42 MHz, which is lower than the Y signal modulation subcarrier frequency by 3.58 MHz of the NTSC color subcarrier frequency To this end, the carrier-suppressed quadrature moduation of the color video signals separated through a filter is frequency converted in the presence of the output of a 3.58-MHz local crystal oscillator, and the resultant frequency converted signal is again frequency converted in the presence of the reconstituted subcarrier (5 MHz × ¼) produced from the luminance signal modulation subcarrier as mentioned above, thus converting the subcarrier frequency into 3.58 MHz. This relation is represented by the following equation:

$$(1.25 \pm S)(1 + \delta) + 3.58 - 5.0(1 + \delta) \times 1/4 = 3.58 \pm S(1 + \delta)$$

The first term on the left side of the equation represents the separated 1.25-MHz color video signal modulation, the second term the 3.58-MHz oscillator output, and the third term the reconstituted subcarrier. By the addition of the first and second terms and the subtraction of the sum and the third term one from the other, the 3.58-MHz modulation on the right side of the equation is obtained. Since the original 1.25-MHz subcarrier is suppressed, the resultant signal is also carrier-suppressed quadrature modulation. In the above equation, S represents the color video signal frequency, and ± S represents the modulation side-bands. $\delta$ represents frequency error component introduced into the reproduced signal due to the elongation of the film and/or fluctuation of the speed of scanning of the film. The extent of the error is the same both for the luminance signal modulation wave (5 MHz) and for the color video signal modulation wave (1.25 MHz). Thus, the variations of both the frequencies of both waves are cancelled with each other to obtain the stable 3.58-MHz wave. (The 3.58-MHz crystal oscillator output is of course selected to be an odd number multiple of half the horizontal scanning frequency according to the NTSC specifications). To the frequency converted signal thus obtained are added vertical and horizontal sync signals and color burst signal prepared from the same 3.58-MHz crystal oscillator in accordance with the NTSC specifications for amplitude modulation of the luminance signal modulation subcarrier of 5.0 MHz to obtain the multiplex signal shown in FIG. 4.

In the above process, the 5-MHz luminance signal modulation subcarrier, which is produced from the luminance signal vestigial-side-band modulation, is available only for the video signal record portion. Therefore, the 5-MHz output should be made continuous even for the vertical and horizontal synchronizing signal period by the provision of a suitable separate means such as an oscillator.

The combination of the frequency converted signal with the vertical and horizontal sync signals and color burst signal added according to the NTSC specifications is then frequency converted such that the resultant signal coincides with the relevant television channel. In this way, the reception and reproduction of the transmitted signal via the antenna of the usual television receiver set is possible.

As is described, in the preceding embodiment no subcarrier is present in the reproduced signal except for the luminance signal modulation subcarrier, so that no beat noise will result. Also, since the subcarrier for one color video signal is suppressed, no higher harmonic components will be introduced within the luminance signal modulation band, which will otherwise result from the non-linear characteristics of the system. Further, it is possible to prevent elongation of the film and fluctuation of the speed of the flying spot of a vidicon and the like from influencing the preparation of the reconstituted subcarrier for the detection of the color video signal from the luminance signal modulation subcarrier and hence influencing the detection of the color video signal.

FIG. 6 shows a further embodiment of the invention. In this embodiment, the Y signal is directly recorded without any modulation, and a pilot signal having a constant frequency of 3.24 MHz lying outside the upper limit of the frequency band of the luminance signal and a constant amplitude is inserted. The two, I and Q, color video signals are converted into a carrier-suppressed modulation signal covering a bandwidth extending 0.5 MHz below and above the subcarrier frequency of 4.32 MHz. The frequency ratio between the pilot frequency and the suppressed subcarrier frequency is selected to be 3 : 4. The simple ratio between integers is necessary to the end of producing a reconstituted subcarrier for demodulating the carrier-suppressed modulation signal from the pilot signal. Both the frequencies are synchronized to each other. Further, to eliminate the line tracking problem as mentioned earlier, both the frequencies are selected to be integral multiples of the horizontal scanning frequency such that they are in phase in each horizontal scan line. The luminance signal, pilot signal and carrier-suppressed quadrature phase modulation signal are recorded in multiplex recording on a frequency division basis on a film with an electron beam recorder or the like. By this arrangement, by virtue of the absence of any recorded subcarrier wave other than the pilot signal no beat noise due to various non-linear characteristics of the system will result.

In playback, the recorded signal is recovered from the film by the scanning thereof with a flying spot tube, vidicon or the like, and from the recovered signal the respective component signals are separated. The luminance signal is separated through a suitable low-pass filter. The pilot signal is separated through a suitable narrow bandpass filter. The carrier-suppressed quadrature phase modulated color signal is separated through a suitable high-pass filter. The pilot signal is utilized to detect the two color video signals from the color video signal modulation.

As mentioned earlier, the pilot frequency and the suppressed subcarrier frequency are synchronized to each other in a simple integer ratio relation. Thus, the suppressed subcarrier can be recovered from the frequency division and multiplication of the pilot signal. With the frequency ratio of 3 : 4 in case of FIG. 6, by multiplying the pilot frequency of 3.24 MHz by 4 and then dividing the resultant by 3 a reconstituted subcarrier at 4.32 MHz is obtained. In the above manner, even if the reconstituted subcarrier wave contains timing variations introduced due to elongation of the film and fluctuation of the speed of the flying spot or the scanning speed of the vidicon, it is always in perfect synchronism with the pilot signal, since it must have been subjected to variations to the same extent as the pilot signal has. Thus, it enables synchronous detection of the color video signals. The reconstituted subcarrier for the demodulation of the quadrature phase modulation should be synchronous therewith not only in frequency but also in phase. However, merely frequency dividing and multiplying the pilot signal will introduce a phase error in the resultant wave. Accordingly, to produce a reconstituted subcarrier in phase with the suppressed subcarrier, it is necessary to provide a certain reference phase. The phase reference may consist of several cycles of the original subcarrier wave inserted adjacent the front of each horizontal scanning line, similar to the color burst in the NTSC color television system. More particularly, in the recording several cycles of the 4.32-MHz subcarrier for the modulation with the color video may be recorded in a marginal portion of each film frame on the side of the start of the horizontal line, as shown in FIG. 8. As mentioned earlier, this subcarrier frequency is an integral multiple of the horizontal scanning frequency, so that the reference signal is recorded as several, uniformly spaced vertical lines in the vertical scanning direction. In the frame portion, the subcarrier wave is of course never recorded since it is suppressed. This phase reference signal may be the color video signal modulation subcarrier itself or it may be a pulse signal of a constant pulse length with the rising or falling of each pulse serving as the reference phase. By having the frequency divider and multiplier locked to this reference phase, a reconstituted subcarrier phase locked to the pilot signal may be obtained. The reconstituted subcarrier thus obtained may be shifted by 90° to produce a quadrature (90° out of phase) reconstituted subcarrier. By using the in-phase and quadrature-phase reconstituted subcarrier waves the carrier-suppressed modulation with the color video signals is demodulated to obtain the two color video signals, which are then combined with the luminance signal to obtain signals presenting color information of the reproduced scene or picture.

To obtain a color television signal according to the NTSC specifications, the two color video signals, namely I and Q signals, recovered in the above manner are used to quadrature modulate the 3.58-MHz color subcarrier, and to the modulation signal are superimposed required vertical and horizontal sync signals and color burst signal. The combination of the signals thus obtained is then frequency converted such that the resultant signal coincides with the relevant television signal. In this way, the reception and reproduction of the transmitted signal via the antenna of the usual television receiver set is possible.

In the above process, the quadrature modulation of the color video signals is once demodulated and then the obtained color video signals are used to place quadrature modulation on the 3.58-MHz subcarrier. It is also possible to convert directly, that is, without demodulation, the quadrature modulation of the 4.32-MHz subcarrier into the quadrature modulation of the 3.58-MHz subcarrier. To this end, the carrier-suppressed quadrature modulation of the video signals separated through the filter is frequency converted in the presence of the output of a 3.58-MHz local crystal oscillator, and the resultant signal is again frequency converted in the presence of the in-phase reconstituted subcarrier wave produced from the pilot signal mentioned earlier, thus converting the subcarrier frequency into 3.58 MHz. This relation is represented by the following equation:

$$(4.32 \pm S)(1+\delta) + 3.58 - 3.24(1+\delta) \times 4/3 = 3.58 \pm S(1+\delta)$$

The first term on the left side of the equation represents the separated color video signal modulation wave, the second term the 3.58-MHz oscillator output, and the third term the in-phase reconstituted subcarrier wave. By adding the first and second terms together and subtracting the sum and the third term one from the other, the modulation signal of 3.58 MHz on the right side of the equation is obtained. Since the original 4.32-MHz subcarrier is suppressed, the resultant signal is also carrier-suppressed quadrature modulation. In the above equation, S represents the color video signal frequency, and ± S the modulation side-bands. $\delta$ represents frequency error component introduced into the reproduced signal due to the elongation of the film and fluctuation of the scanning speed of the film. The extent of the error is the same both for the color video signal modulation wave and the pilot wave. Thus, the errors of both the waves cancel as in the above equation to obtain the stable 3.58 MHz wave. The 3.58-MHz crystal oscillator output is of course selected to be an odd number multiple of half the horizontal scanning frequency according to the NTSC specifications. To the color video quadrature modulation signal of 3.58 MHz thus obtained are added required vertical and horizontal sync signals and color burst signal, and the combination of the signals thus obtained is then frequency converted into coincidence with the relevant television channel. In this mode, it is possible to receive and reproduce the transmitted signal via the antenna of the usual television receiver.

In addition to using the pilot signal for the production of the reconstituted subcarrier for demodulation as described above, it may also be utilized for stabilizing the reproduced frequency. After photoelectric conversion, the pilot signal is usually rendered into a wave at 3.24 $(1+\delta)$ MHz due to elongation of the film, fluctuation of the scanning speed and so forth. As mentioned earlier, $\delta$ represents the extent of frequency error. This error can be eliminated by appropriately controlling the scanning speed. More particularly, on the reproducing side a reference frequency oscillator oscillating at 3.24 MHz may be provided, and its output frequency is compared with the reproduced frequency by means of a frequency discriminator, so as to feed the error voltage proportional to the difference or error frequency back to the scanning means so that the error voltage may be reduced to zero. In other words, the slope of the saw-tooth sweep voltage of the vidicon or flying spot tube may be controlled by a suitable control circuit such that it is reduced when the error voltage is positive and increased in case of a negative error voltage. For example, the time constant of a saw-tooth wave generator may be made variable according to the error voltage. When the reproduced pilot signal frequency is controlled to be constant in the above manner, the reconstituted subcarrier frequency will of course be constant. In such case, it is possible to detect the color video signals by using a color burst controlled oscillator locked to the color burst signal, entirely in the same manner as the reproduction of the NTSC color television signal.

In the preceding embodiment, the pilot signal P is spaced below the lower limit of the color signal modulation band. Alternatively, it may be spaced above the upper limit of the color signal modulation band.

FIG. 7 shows a further embodiment. In this embodiment, the pilot signal P is at a frequency of 5.0 MHz while the carrier-suppressed modulation subcarrier is at 3.75 MHz. The ratio between the two frequencies is 4 : 3. The latter frequency may be produced from multiplication by 3 and division by 4 of the former frequency under the same principles as in the previous embodiment of FIG. 6.

As is described, in the preceding embodiments according to the invention since no other recorded subcarrier is present than the pilot wave, no beat noise will result. Also, since the reconstituted subcarrier for the demodulation of the color video modulation signal is produced from the pilot signal synchronously related thereto, even if the reproduced frequency is subject to variations due to elongation of the film and fluctuation of the scanning of a flying spot tube, vidicon or the like, it will have no effect on the detection of the color video signals and reliable detection may be ensured.

Although the foregoing embodiments have dealt with the I and Q signals as the color video, the process according to the invention of course equally applies to the B − Y and R − Y color difference signal.

What we claim is:

1. A color television signal recording and reproducing system for recording and reproducing three signals carrying color information, namely a luminance signal and two color video signals, comprising:

means for recording one of said signals as a vestigial side-band amplitude modulation signal of a first subcarrier; and means for recording another of said signals as a carrier-suppressed both side-band amplitude modulation of a second subcarrier.

2. A color video signal recording and reproducing system for recording a luminance signal and two color video signals on and reproducing said signals from a monochrome film, comprising: means for producing a carrier-suppressed double side-band amplitude modulation signal of at least one of said color signals, and means for multiplex recording the luminance signal and the resulting modulation signal on one frame of said film.

3. The color video signal recording and reproducing system according to claim 2, wherein said modulation signal producing means comprises means for modulating at least one carrier signal with both of said color signals to produce a suppressed carrier double side-band amplitude modulated signal.

4. The color video signal recording and reproducing system according to claim 3, wherein said multiplex recording means record the luminance signal with no modulation.

5. The color video signal recording and reproducing system according to claim 4, wherein said modulation signal producing means produce a carrier-suppressed quadrature phase modulation signal of said two color signals; said system further comprising means for producing a pilot signal having a constant frequency which is in an integer ratio relation to a carrier frequency of said quadrature modulation signal; said recording means including means to multiplex-record the pilot signal, modulation signal and luminance signal of different frequencies respectively; and said system further comprising means for producing a local carrier necessary for demodulation or frequency conversion of said carrier-suppressed quadrature phase modulation signal on reproduction from said pilot signal.

6. The color video signal recording and reproducing system according to claim 5, further comprising means for controlling reproduction of the recorded pilot signal to make the frequency of the reproduced pilot signal constant in coincidence with said constant frequency of said pilot signal producing means.

7. The color video signal recording and reproducing system according to claim 4, wherein said modulation producing means produce respective amplitude modulation signals of said two color signals, including means for determining carrier frequencies of said respective modulation signals in an integer ratio relation and in a synchronized relation to each other, and said system further including frequency division means for producing a local carrier which is necessary for demodulation of said carrier-suppressed double side-band signals.

8. The color video signal recording and reproducing system according to claim 3, further comprising means for producing a vestigial side-band amplitude modulation signal of the luminance signal.

9. The color video signal recording and reproducing system according to claim 3, wherein said modulation means produce a quadrature phase modulation signal of said two color signals; and said system further comprising means for producing an amplitude modulation signal of the luminance signal, means for determining carrier frequencies of said luminance modulation signal and said quadrature phase modulation signal in an integer ratio relation and in a synchronized relation to each other, and frequency division means for producing a local carrier which is necessary for the demodulation of said carrier-suppressed double side-band signal.

10. The color video signal recording and reproducing system according to claim 9, further comprising means for producing a vestigial side-band frequency modulation of the luminance signal, wherein said determination means determine the carrier frequencies of said luminance signal and said quadrature phase modulation signal in an integer ratio relation and in a synchronized relation to each other, said multiplex recording means including means to record resultant different frequencies of said modulation signals in said one frame, and said frequency division means produces the local carrier which is necessary for the demodulation or frequency conversion of the carrier-suppressed quadrature phase modulation color signal from the luminance signal carrier on reproduction.

* * * * *